June 12, 1928.  J. L. FEARING  1,673,002

CONTROL OF ELECTRIC WAVES

Filed Feb. 28, 1923   4 Sheets-Sheet 1

Inventor
Justin L. Fearing.
by  W. Griggs
Att'y.

June 12, 1928.
J. L. FEARING
1,673,002
CONTROL OF ELECTRIC WAVES
Filed Feb. 28, 1923
4 Sheets-Sheet 3

Inventor
Justin L. Fearing.
by EWGriggs Att'y.

Patented June 12, 1928.

1,673,002

UNITED STATES PATENT OFFICE.

JUSTIN L. FEARING, OF JAMAICA, NEW YORK, ASSIGNOR TO WESTERN ELECTRIC COMPANY, INCORPORATED, OF NEW YORK, N. Y., A CORPORATION OF NEW YORK.

CONTROL OF ELECTRIC WAVES.

Application filed February 28, 1923. Serial No. 621,740.

The present invention relates to the control of electric waves, and involves both means and method for effecting the control.

The invention is concerned with the production of a resultant wave which will possess desired varying characteristics, such as an amplitude varying in accordance with any desired manner of control. A specific application of the invention is in signaling, where, for example, it frequently becomes desirable to produce and transmit a wave the amplitude of which varies in accordance with signals to be sent. The signals may, of course, have any kind of wave form such as flat-topped current impulse waves of the kind used in telegraphy, or irregular shaped variable amplitude waves such as speech waves. While the invention will be described with particular reference to signaling, and more specifically to speech transmission as being typical, the invention is capable of general application and should not be construed as being limited to any particular field or manner of use.

Wave controlling systems are known in which the wave to be controlled is applied to a variable impedance device, the impedance of which may be varied in accordance with the desired control. In particular, electric discharge tubes, magnetic modulators, and the like, have been used, the transmission characteristic of which for the wave to be controlled, varies in accordance with an impressed control wave such as speech. In cases where it is desired to suppress the transmission of the wave to be controlled, except when the control wave is impressed, it has been customary to connect two such modulating devices in balanced or differential relation as to the outgoing circuit so that the wave to be controlled transmitted through one of the devices is neutralized by that through the other.

In the devices used heretofore, of the general character mentioned, even though the wave to be controlled (commonly called the carrier wave) be balanced out except when it is being varied or controlled, there is a continuous transmission of the carrier wave through the individual impedance devices themselves, with consequent useless expenditure of energy.

It is a particular object of the invention to provide a more efficient means and method of modulating a carrier wave by avoiding the useless losses present in devices and systems heretofore known.

It is a feature of the invention that substantially no energy dissipation takes place in the modulating impedance device when no control is being exerted.

In the preferred forms of embodiment of the invention to be described more fully hereinafter, a unidirectionally conducting element, that is, a substantially complete half-wave rectifier, is used as the modulating element to which the carrier and control waves are applied, and a blocking potential of such magnitude is associated with the rectifier that substantially no current flows through the rectifier when the carrier wave alone is applied thereto. The blocking potential, however, is so proportioned that, when the signal or control wave is impressed simultaneously with the carrier wave, the rectifier transmits current of an amplitude substantially proportional to the amplitude of the impressed control wave.

These general features and objects of the invention will be more clearly understood from the more detailed description which follows, and as the description proceeds the various other and subsidiary features and objects of the invention will appear, no attempt having been made to enumerate or specify these in the general statements that have been given above. In connection with the description, reference will be made to the accompanying drawings, in which.

Figure 1:
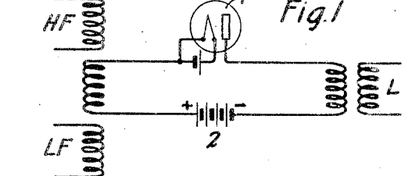
Figs. 1 and 2 illustrate in simple diagrammatic manner the broad principle of operation of the invention, and Figs. 3 to 15, inclusive, illustrate in schematic manner various forms and modifications of embodiment of the invention, all of which will be explained as the description progresses.

In Fig. 1, a simple form of wave controlling or modulating circuit is illustrated in which the rectifying device 1 is associated with a source of waves to be controlled, such as carrier waves indicated at HF, these waves commonly having a relatively high frequency; a source of controlling or modulating waves of relatively low frequency indicated at LF; an outgoing circuit or load circuit indicated at L; and a polarizing source 2. The device 1 may be any suitable type of unilaterally conducting device possessing a transmission characteristic capable of producing a modulating effect. It is illustrated in this figure as comprising an electric discharge device of well known type having a heated cathode and a plate or anode. This discharge tube is preferably designed to be substantially non-conducting while the anode is negative with respect to the cathode, and to be conducting while the anode is positive. The impedance of the tube is as nearly as possible constant over a considerable portion of the transmission range of the tube, whereby the current through the tube varies in substantially linear proportion to the voltage applied to the tube. The desired effect may be obtained in practice, using a tube whose impedance varies with the impressed voltage, by choosing a tube having impedance which is low with respect to that of the circuits connected in series therewith, so that the variations in tube impedance within the transmission range are substantially negligible. This causes the tube circuit to transmit a current the instantaneous values of which are linearly proportional to the impressed voltage throughout an operating range. Under these conditions a fairly continuous voltage existing, say, for several periods of the high frequency wave determines a high frequency transmitted current of a definite amplitude, and as the fairly continuous voltage changes to another value the high frequency current also changes to a corresponding other value. Any known devices may be utilized for giving the tube 1 the desired straight line transmission characteristic. For example, an equipotential cathode will contribute toward realizing this straight line voltage-current effect and this type of cathode may be employed together with any other means for aiding in securing the desired characteristic. The equipotential cathode may be of any well known type, an example being that shown in an application for patent, of Alexander M. Nicolson, Serial No. 322,944, filed September 10, 1919.

The source 2, it will be noted, has its negative pole connected to the anode and its positive pole connected to the cathode. A rectifier of the type shown transmits practically zero current, that is, has substantially infinite impedance, when its anode is at a negative potential with respect to the cathode. Accordingly, it will be assumed that no current is transmitted to the outgoing circuit L except at those instants when the impressed potential makes the anode positive with respect to the cathode.

Figure 2:
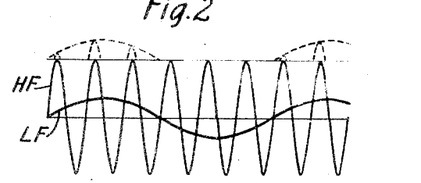

Fig. 2 indicates the action of a circuit such as is shown in Fig. 1. In plotting the curves of this figure it is assumed that the high frequency wave HF has an amplitude large compared with that of the controlling wave LF and that the blocking potential of the source 2 is just equal to the maximum voltage of the wave HF. When these conditions exist, it is evident that no current is transmitted to the load L, except for the instants when both impressed waves act on the device 1 in the positive direction. When the wave LF is zero or negative no current is transmitted, but when the wave LF is positive impulses are transmitted to the outgoing circuit L at the frequency of the wave HF and with an amplitude substantially directly proportional to the instantaneous amplitude of the wave LF. The current impulses transmitted to the outgoing circuit are indicated in Fig. 2 by dotted curves above the peaks of the wave HF.

It is preferred that the carrier frequency should be of large amplitude compared with the signaling frequency, as is roughly indicated in the curves of Fig. 2. When the carrier is of large amplitude as compared with the signal, the percentage modulation that is effected for all amplitudes of the signal is more nearly constant.

It is preferable to include a resonant circuit at some point in the path of the outgoing impulses, the resonant frequency of which corresponds approximately to the frequency of the wave HF. The unidirectional impulses transmitted through the tube 1 will then impulse the resonant circuit at the proper times to maintain the oscillations. The resonant circuit should have the proper amount of damping so that the oscillations set up in it are at all times under the control of the exciting impulses in order that the amplitude of the resultant wave may be determined by the amplitude of the impressed impulses. Resonance aids in smoothing out the wave and suppressing transmission of relatively high harmonics which are not essential to preserving the wave form of the signal. In many cases such as in radio transmission, the load circuit such as an antenna may itself provide the proper resonance and damping.

The general remarks given above relative to the different properties of the circuit and the relations of the impressed waves, are applicable to all of the systems that are to be described.

Figure 3:
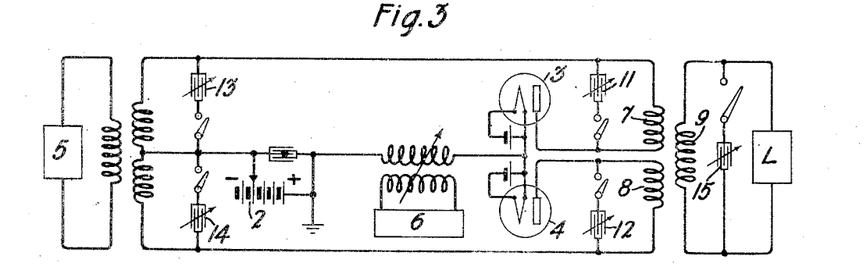

Referring to Fig. 3, a pair of devices 3 and 4 are connected in common between the sources of waves 5 and 6 and the load L. Each of the devices 3 and 4 may be similar to the device 1 of Fig. 1. The sources 5 and 6 represent a source of carrier waves and a source of control waves, and the effects will be described for both the cases in which 5 is the source of carrier and 6 is the source of control and vice versa. Assuming first that the carrier source is represented at 5 and the control source at 6, then the control wave is impressed similarly on both devices 3 and 4 and tends to make both anodes positive at the same time. The high frequency, however, is applied in positive direction alternately on the devices 3 and 4 and it will be seen therefore that the combined action of the waves from sources 5 and 6 makes the tubes 3 and 4 alternately conducting at the carrier frequency. Impulses of current are therefore alternately transmitted through the windings 7 and 8, both of which are inductively related to the secondary 9. Under the conditions assumed the direction of winding of the coils 7 and 8 with respect to 9 is such that the induced currents in 9 from the respective windings 7 and 8 alternate in direction, thus causing positive and negative impulses to be applied to the load during those portions of the signaling wave that are positive, these impulses being proportional to the amplitude of the signaling or control wave. The energy applied to the load in this case contains no wave component of unmodulated carrier wave frequency. If desired, however, any amount of unmodulated carrier wave may be transmitted to the load by reducing the value of the E. M. F. of the source 2.

Assuming now that the source 5 is the control wave and the source 6 is the carrier wave, the tubes 3 and 4 will be alternately conducting for several periods of the carrier wave so that the coils 7 and 8 alternately transmit a series of impulses having amplitudes depending on the amplitude of the control wave. Under these conditions the impulses impressed on the load continue through both the positive and negative portions of the control wave. A phase shift occurs between the transmitted high frequency wave in passing from the condition when tube 3 is transmitting to the condition in which tube 4 is transmitting. Although there are or may be slight discontinuities in the transmitted wave due to its complete half wave rectification by the devices 3 and 4, the transmitted wave is a pure modulated wave having no component of the unmodulated carrier frequency, but comprising modulation components only. Due to the presence of resonance in the load circuit the transmitted wave is given a substantially smooth form. In order to derive the original modulating wave-form from such a wave it is of course necessary to introduce the unmodulated carrier component at the receiving point.

The condensers 11 and 12 when thrown into the circuit by closure of their associated switches provide resonance to the wave being transmitted to the load by cooperating with the windings 7 and 8, respectively. Condensers 13 and 14 provide paths of low impedance to carrier waves when the source 5 supplies modulating waves, and are shown for insertion into the circuit by closure of their associated switches. The relatively sharp impulses transmitted through the tubes 3 and 4 produce as their immediate effect the charging of the condensers 11 and 12. These condensers then discharge through the respective windings 7 and 8 and the discharge may take place during the instants of no transmission through the tubes 3 and 4. Succeeding impulses similarly are stored in the condensers 11 and 12 and upon their discharge assist in giving a relatively smooth output wave. The condenser 15 preferably cooperates with the winding 9 to give resonance at the carrier frequency. Any type of load circuit may be employed such as a line or an antenna. In the case of an antenna load the condenser 15 may be considered as the antenna capacity and the element L may in such case be regarded as absent or as an infinite impedance. In the arrangement according to Fig. 3 as has been described, either modulated wave trains capable of being received on a simple detector may be transmitted, these trains occurring with the positive portions of the controlling wave and being transmitted with or without unmodulated carrier waves, or a pure modulated wave may be transmitted requiring for its reception that a wave of the carrier frequency be supplied at the receiving station.

Figures 4, 5, 6, 7:
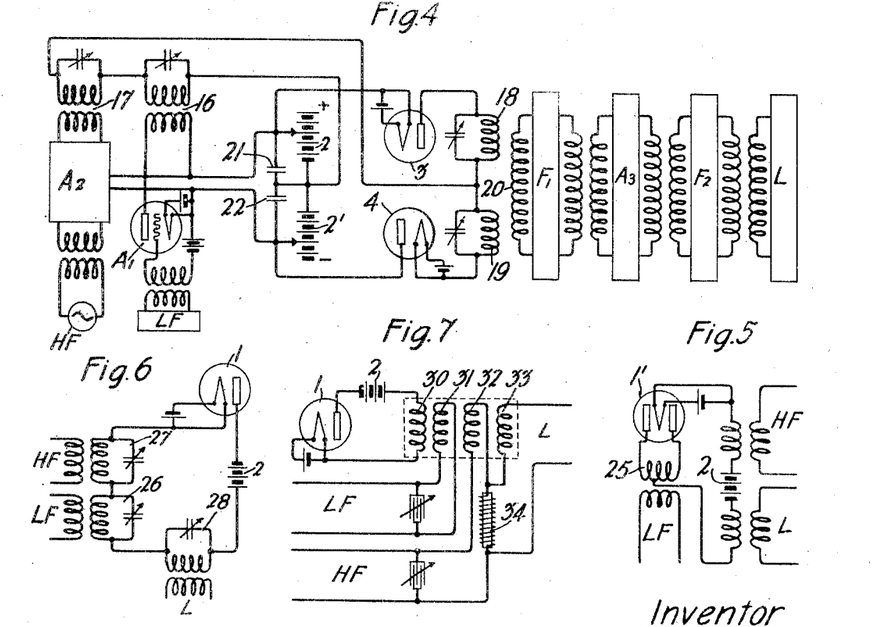

In the arrangements that have been described, the impressed potentials exceeding the potential of the polarizing source 2 and rendering the anode positive with respect to the cathode, are in such direction as to charge the battery 2. In Fig. 4 an arrangement is shown in which the energy which acts to charge the polarizing battery is utilized by the system. In this figure the polarizing source is shown in two portions 2 and 2' respectively, which together serve as a source of space current for amplifiers $A_1$ and $A_2$. These amplifiers are associated respectively with the signal source LF and the carrier source HF, and serve to increase the voltage of the waves from these respective sources before they are applied to the modulator tubes 3 and 4. The waves are applied to the modulators through the transformers 16 and 17. The devices 3 and 4 are connected oppositely with respect to each other so that during the positive portion of the control wave, positive portions of the carrier wave are transmitted through one of the devices 3, 4, while during the negative portion of the control wave, negative portions of the carrier wave are transmitted through the other of said devices. With this type of connection the output windings 18, 19 and 20 may be wound in the same direction so that impulses transmitted through devices 3 and 4 will affect winding 20 in the same direction. Any type of load circuit may be employed, the circuit illustrated comprising the load proper indicated at L and two filters $F_1$ and $F_2$ with a stage of amplification at $A_3$. Each of the filters $F_1$ and $F_2$ may be constructed in accordance with the disclosure in U. S. Patent No. 1,227,113 to Campbell, issued May 22, 1917. These filters may be proportioned to transmit the modulated wave or any portion of it, for example, they may preferably transmit only that portion of one side band of the modulated wave which is useful in conveying intelligible speech. The amplifiers $A_2$ and $A_3$ may be of the same type as indicated at $A_1$, this being the well known three-electrode thermionic discharge device. The chain of circuits $F_1$, $A_3$, $F_2$, L may be connected to the output or load circuit L of any of the figures disclosed in connection with the present invention.

The source LF and HF in Fig. 4 may each have a relatively small amplitude and most of the energy impressed on the modulating system may be derived from the batteries 2, 2' which supply the amplifiers $A_1$ and $A_2$. The voltages applied to the modulating system in part produce current flowing in the secondary 20 to supply the outgoing circuit and in part recharge the batteries 2 and 2'. The condensers 21 and 22 serve as high frequency by-passes around the battery.

Fig. 5 illustrates a simplified arrangement permitting a substantially continuous transmission of the modulated wave for both the negative and positive portions of the control wave. The discharge device 1' is shown provided with a single cathode and two anodes connected to respective terminals of the winding 25. Instead of a single device with two anodes it would be obvious to provide two single-anode devices having their cathodes connected together and their anodes connected to respective terminals of winding 25. The low frequency or signaling wave tends to render the anodes alternately positive with respect to the cathode. The high frequency wave therefore produces, during its positive half cycles, impulses of current between the cathode and that one of the anodes which is being influenced in the positive direction by the impressed control wave. Impulses of the same direction are fed into the load circuit L for both the positive and negative portions of the control wave. If these are received in a simple detector, a detected wave having a frequency double that of the control wave is produced.

Fig. 6 is similar to the arrangement of Fig. 1, but differs therefrom in providing separate input transformers for HF and LF. If the low frequency wave has a definite predominant frequency the circuit 26 is preferably tuned to this frequency, the tuning being sufficiently broad to accommodate the essential signaling frequencies, or if desired, the capacity in the circuit 26 may be adjusted to readily pass the HF waves around the source of LF waves without tuning circuit 26 to the modulating waves. The circuit 27 is preferably tuned to the impressed high frequency and the circuit 28 to which the load is coupled is tuned to the modulated wave, this tuning being broad enough to accommodate the components comprised in the modulated wave. In the arrangement of this, as of the other figures, no carrier wave is transmitted, except when there is an impressed signal wave and the carrier is only then transmitted during the instants when the control wave is positive.

An arrangement is shown in Fig. 7 for effecting modulation in accordance with the invention by inductively varying the impedance of a carrier wave circuit. In this figure the windings 30, 31, 32 and 33 are all inductively related and may conveniently be wound on a common core, this intimate relation being diagrammatically indicated by the dotted line enclosing these coils. The windings 32 and 33 are wound in opposite direction with respect to each other so that normally the high frequency impressed through the inductance 34 and through the winding 32 induces an E. M. F. in the winding 33 which is equal in amplitude and opposite in phase to the E. M. F. impressed on the inductance 34 directly from the high frequency source. This arrangement prevents any high frequency current from normally reaching the line L. Except when the device 1 is conducting, the winding 30 is in effect in an open circuit. During the positive portions of the signaling wave and of the high frequency wave, however, sufficient positive potential is applied to the anode of the device 1 to cause it to conduct current and in effect reduce the impedance of the windings 32 and 33 whereby the E. M. F. induced in the winding 33 is reduced. At the same time the reduced impedance of winding 32 causes an increase in current through inductance 34 and an increase in E. M. F. applied thereto. The E. M. F. induced in winding 33 no longer balances the E. M. F. applied to inductance 34 and the difference between these E. M. F.'s is applied to the line.

Figure 8:
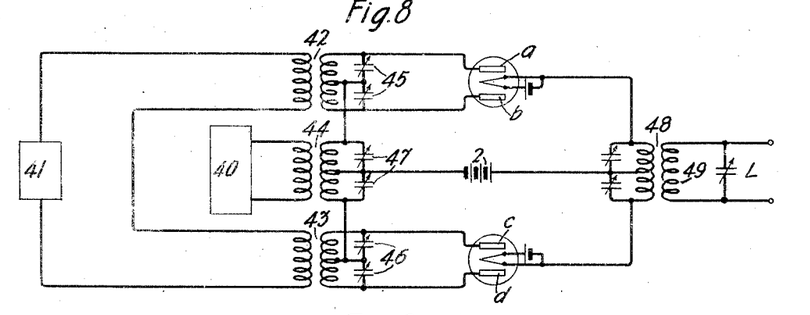

In Fig. 8 four discharge spaces are provided between the wave sources 40 and 41 and the load circuit L, these waves being applied to the modulating devices through the transformers 42, 43 and 44. Considering the case first in which source 40 is the high frequency or carrier wave and source 41 is the low frequency or modulating wave, it will be seen that source 41 tends to make one of the upper pair of anodes $a$, for example, and one of the lower pair of anodes $c$, for example, positive for a number of the high frequency periods, while the other respective anodes $b$ and $d$ are influenced further negative by the low frequency wave. The high frequency wave from source 40 tends to make the upper pair of anodes and the lower pair of anodes alternately positive, and as a result of the combined action of the two waves, current will be transmitted through the upper and lower halves of the primary winding 48 alternately in synchronism with the high frequency wave. The winding 48 is shown as continuous in the same direction so that the impulses of the carrier frequency act in succession oppositely upon the tuned circuit 49 to set up oscillations of the carrier frequency in this circuit. As the low frequency wave from source 41 reverses direction, the other pair of anodes $b$ and $d$ are made operative under the combined control of both waves and the impulses for exciting the circuit 49 continue through both the negative and positive portions of the modulating or control wave. The resultant modulated wave comprises a series of wave trains passing to zero amplitude at the instants when the modulating wave passes through zero, and since it is immaterial to the phase or direction of the current in winding 48 whether anode $a$ or $b$, for example, is active, there is no phase shift in the high frequency wave in circuit 49 when the modulating wave changes sign, and hence the modulated wave will, upon detection, yield a wave of twice the modulating frequency whether a local reinforcing wave be used or not in receiving. If the two halves of the winding 48 be reversely wound so that current flowing in either half of the winding induces impulses of the same direction in circuit 49, the carrier-wave developed in circuit 49 will have a frequency double that of the source 40 and this wave will likewise, upon detection, yield a low frequency wave of twice the frequency of the modulating wave.

Considering now the case in which source 40 is the modulating or control wave and source 41 the high frequency or carrier wave, source 40 tends to make both anodes $a$ and $b$ positive for a duration equal to several periods of the high frequency waves, and source 41 tends to make anodes $a$ and $b$ alternately positive. As a result a unidirectional impulse is fed through the upper half of winding 48 for each half cycle of the high frequency wave producing a current of twice the carrier frequency in the resonant circuit 49. When the modulating wave changes sign, anodes $c$ and $d$ become active and impulses are transmitted through the lower half of winding 48 for each half cycle of the carrier wave. If the winding 48 is continuously in the same direction the impulses through the lower half of winding 48 are opposite in their effect on the circuit 49 from the impulses in the upper half of winding 48, and the phase of the current produced in circuit 49 is, therefore, dependent on whether the anodes $a$ and $b$ are active or the anodes $c$ and $d$ are active, this being dependent in turn upon the sign of the low frequency wave. Under these conditions, therefore, the outgoing wave is a pure modulated wave having no component of the unmodulated carrier frequency but containing components of the modulation frequency in a series of wave trains which have phase reversals corresponding to reversals in sign of the modulating wave. Such a wave, as is well known, will yield upon simple detection a wave of double the modulating frequency, or if it be received in combination with a reinforcing wave of the carrier frequency, it will yield a wave corresponding to the modulating wave. If the two halves of winding 48 be reversely wound the outgoing wave will have a frequency twice that of the carrier and will yield, upon detection, double frequencies of the modulating wave.

The preferred form and the operation is that above described in which source 40 is the modulating wave and source 41 the carrier wave. In this case condensers 45 resonate with the transformer 42 at the carrier frequency, and condensers 46 and transformer 43 resonate at the same frequency. Condensers 47 from high frequency by-passes about the low frequency transformer 44. The anodes $a$, $b$, $c$, and $d$ may be placed in two tubes, as shown, or may each be in a separate tube, the tubes being arranged in pairs with their filaments connected together, as in Fig. 3.

Figure 9:
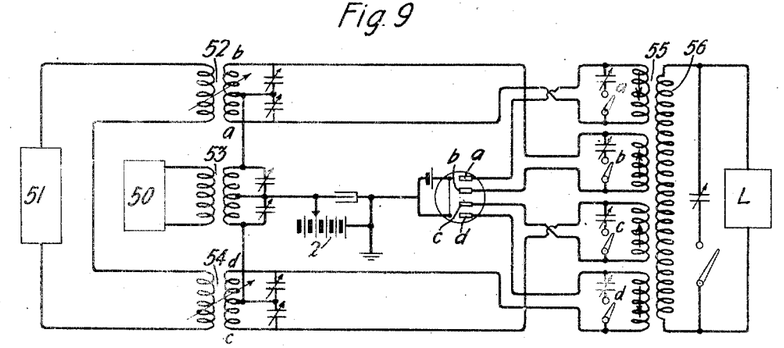

Fig. 9 shows an embodiment of the invention which is flexible in construction and lends itself to a variety of uses since it may be adjusted to give modulated waves of diverse types. The anodes $a$, $b$, $c$ and $d$ are shown as comprised within a single enclosure in which is also a cathode serving in common for all four anodes. If desired, however, two or four enclosures for the four anodes could be employed and a corresponding number of cathodes, all of which would be connected together. The sources of applied waves are indicated at 50, 51, these waves being applied to the modulating discharge spaces through the transformers 52, 53 and 54, as shown. The output transformer, indicated generally at 55, comprises a common secondary 56 and a separate primary for each of the anodes, these primaries being given the designations $a$, $b$, $c$ and $d$, corresponding to their respective anodes. It may be seen that whichever source 50, 51 is the high frequency, the other being the low frequency, a current will flow through one of the primary windings of the output transformer 55 for each half cycle of the applied high frequency wave and the form of the resultant outgoing wave will be determined by the direction of winding of the primaries of the transformer 55 regardless of which source 50, 51 is the high frequency.

It will be assumed that source 50 is the low frequency or modulating frequency source and that source 51 is the high frequency or carrier source. When the modulating wave makes the upper terminal of the secondary of transformer 53 positive, both terminals $a$ and $b$ of transformer 52 will have their potentials increased in the positive direction for a number of periods of the high frequency wave, and the high frequency wave will tend to make the terminals $a$ and $b$ of transformer 52 alternately still further positive. As a result, the anodes $a$ and $b$ are rendered alternately positive with respect to the cathode at the carrier frequency, and the windings $a$ and $b$ of transformer 55 alternately transmit current for the duration of a half cycle of the high frequency wave. As the modulating wave changes sign the anodes $c$ and $d$ become alternately active, and the windings $c$ and $d$ of transformer 55 transmit current alternately for each half cycle of the high frequency wave. If now the direction of winding of the transformers 52 and 54 is such that the terminals $b$ and $d$ thereof are influenced in the positive direction at the same instant by the high frequency wave, following out the direction of winding indicated on the drawing, the direction in which current tends to flow in winding $b$ of transformer 55 is opposite in direction to that tending to flow in winding $d$. Similarly, when the terminals $a$ and $c$ of the transformers 52 and 54 are respectively positive, the direction in which current tends to flow in the windings $a$ and $c$ of transformer 55 are respectively opposite, the current tending to flow through the winding $a$, being also opposite to the current through winding $b$ and the current through winding $c$ being opposite to the current through winding $d$. As a result, it will be seen that windings $a$ and $b$ of transformer 55, when they are active, transmit to the secondary 56 impulses of current alternating in direction to cause the production of a carrier wave in the load circuit having an amplitude directly proportional to the amplitude of the modulating wave. Further, when the modulating wave reverses in sign bringing the windings $c$ and $d$ of transformer 55 into action, the impulses transmitted from these windings into the outgoing circuit are opposite in sign to those transmitted from the windings $a$ and $b$. The outgoing wave is, therefore, made up of wave trains which undergo phase reversals corresponding to reversals in sign of the modulating wave and the outgoing wave is, therefore, a pure modulated wave, which will yield the signal wave upon combination at the receiver with a wave of the carrier frequency.

The condensers shown associated with the respective primary windings of transformer 55 may be included in circuit by means of the switches shown and may be adjusted to resonance for the transmitted wave.

By reversing one or more of the primary windings $a$, $b$, $c$, and $d$ of transformer 55, the type of outgoing wave may be modified to have any one of a number of forms. The nature of wave produced for any arrangement of windings may easily be determined by tracing through the effects for each case after the manner which has been employed above in connection with this and the preceding figures.

Figure 10:
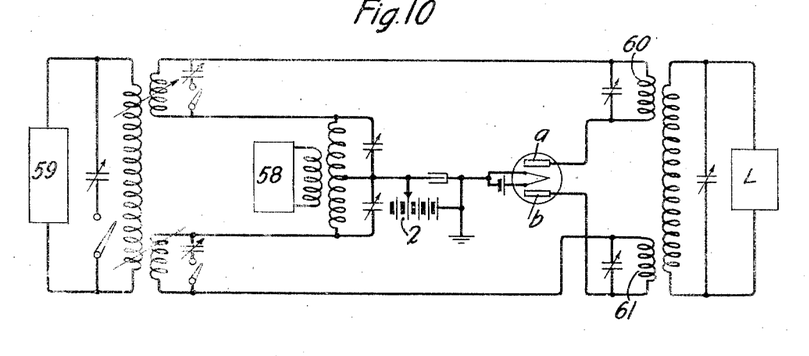

In Fig. 10, if source 58 is the modulating wave source and 59 the carrier wave source, the anodes $a$ and $b$ will be alternately influenced toward a positive potential by the modulating wave for the duration of several cycles of the high frequency wave. The anodes will likewise be influenced toward a positive potential at the carrier wave frequency. As a result, anode $a$, for example, is active to transmit an impulse once for each cycle of the high frequency wave when the modulating wave has one direction or sign, and for the opposite direction of the modulating wave the anode $b$ transmits an impulse for each cycle of the high frequency wave. The windings 60 and 61 of the outgoing transformer are indicated as being wound in the same direction with respect to the secondary. As a result, there is transmitted to the outgoing circuit a series of impulses of the same sign, one for each cycle of the high frequency wave. Assuming that source 59 is connected oppositely to anodes $a$ and $b$, as shown, a phase shift occurs between the wave trains produced by portions of the modulating wave of respectively opposite direction so that the resultant outgoing wave is a pure modulated wave capable of yielding the signal wave upon detection in combination with a wave of the carrier frequency.

Figure 11:
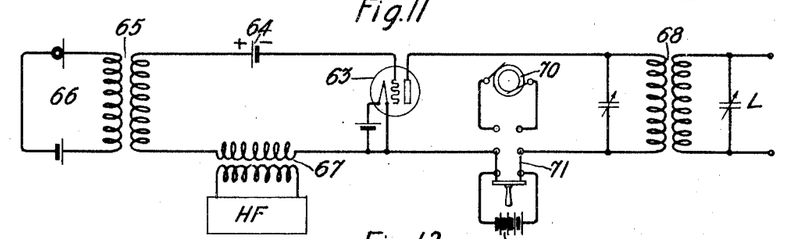

In Fig. 11, a modulating circuit in accordance with the invention, employing a three-electrode discharge device, is indicated. This device, shown at 63, may comprise a device of the well-known space current relay type comprising a heated cathode, an anode and a grid or control element as shown. The grid or input circuit of this device includes the polarizing battery 64 for normally polarizing the grid negative with respect to the cathode, the speech input transformer 65 coupled with the microphone circuit 66, and the carrier input transformer 67 coupled to the source HF. The plate or anode circuit includes the primary of the outgoing transformer 68 coupled to the load circuit, and a source of space current which may comprise either the unidirectional source 69 or the alternating source 70, dependent upon the position of the switch 71.

In the operation of this circuit the source 64 is normally given such a negative potential that when either the voltage applied to the grid through transformer 65 or 67 alone is positive, space current through the device 63 remains zero or practically zero for the highest voltage impressed on the plate or anode from the source 69 or 70. As a result, no current is transmitted to the line except when both sources 66 and HF are applying potentials to the grid circuit in the positive direction and hence no carrier is transmitted except when speech or modulating waves of the proper direction are also being applied. During the times when both the carrier and the modulating waves are impressing positive potentials on the grid circuit, the grid will be influenced so far in a positive direction as to permit the device 63 to transmit current for portions of each cycle of the high frequency wave, the current so transmitted being approximately proportional to the amplitude of the modulating or low frequency wave. The current so transmitted to the load circuit will be substantially as indicated by the dotted tips of the waves indicated in Fig. 2. If the alternating source of space current 70 is used in place of the constant current source 69, the device 63 will transmit modulated high frequency current only during the positive portions of the current waves from the source 70. The condensers shown in conection with the primary and secondary windings of transformer 68 may be adjusted to resonance at the frequency of the transmitted wave and it is preferable, as explained in connection with Fig. 1, to provide such resonance in order that the principle of shock excitation may be employed for both increasing the amplitude of the output wave and improving its form by suppressing unnecessary harmonics.

Figure 12:
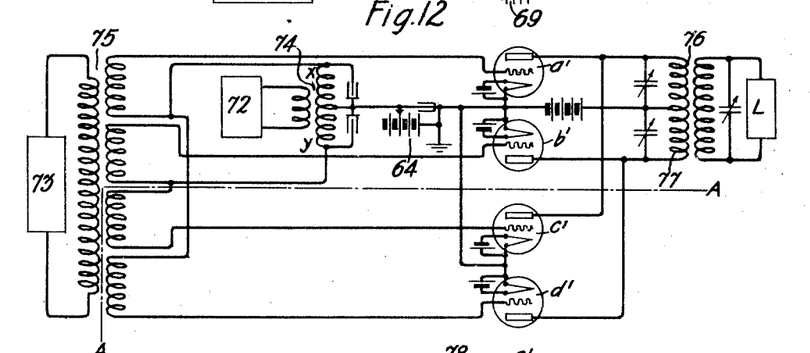

The circuit of Fig. 12 is somewhat similar to that of Fig. 8 above described, Fig. 12 employing three electrode devices where Fig. 8 employs two electrode devices. Considering first the case in which the low frequency or modulating wave source is at 72 and the high frequency carrier wave source is at 73, the wave from source 72 will influence the terminal $y$ of the transformer 74 and hence the grids $b'$ and $c'$ toward a positive potential for the duration of several periods of the high frequency wave from source 73. For certain portions of those half cycles of the high frequency wave which also influence grids $b'$ and $c'$ toward a positive potential, the corresponding discharge tubes will transmit current. However, the secondary windings of the input transformer 75 are preferably connected so that the grids $b'$ and $c'$ are alternately influenced totward a positive potential by the high frequency wave, and hence the primary windings 76 and 77 of the output transformer alternately transmit current impulses of respectively opposite direction to the outgoing circuit or load. When the wave from source 72 reverses in sign, the grids $a'$ and $d'$ are influenced in positive direction by the signaling or modulating wave and the corresponding two discharge devices transmit alternately similar current impulses through the respective windings 76 and 77. The direction of current flow through the windings 76 and corresponding to a given half cycle of the high frequency wave depends upon the sign of the signaling or low frequency wave and reverses in direction with reversals of sign of the signaling wave. It is seen, therefore, that the wave finally transmitted is a pure modulated wave, that is, a wave containing the side band components with no unmodulated carrier component.

The circuit of Fig. 12 as shown and as has been described, by providing four discharge tubes, enables the outgoing circuit to be impulsed once for each half cycle of the high frequency wave. If the portion of the circuit below and to the right of the broken line A—A is removed, the remaining portion of the circuit will transmit a current impulse once each cycle of the high frequency wave and the resultant transmitted wave will be, as before, a pure modulated wave but of less energy content and less regular in form since the oscillatory circuits associated with the output transformer 76, 77 are impulsed only once each complete period instead of once every half cycle.

Figure 12A:
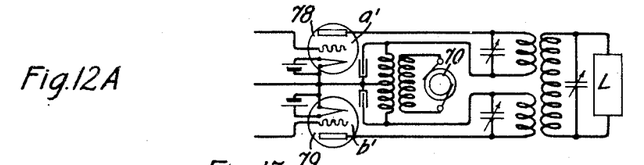

Fig. 12$^A$ shows provision for supplying the space currents of a pair of three-electrode devices, which may be assumed to be the upper two devices of Fig. 12, from a source 70 of alternating current. A second pair of discharge devices corresponding to the lower pair of Fig. 12 may be supplied with current from the same source by connecting the respective anodes of the second pair of devices directly to the anodes of the devices shown in Fig. 12$^A$ in the manner indicated in Fig. 12. The anodes of the two devices 78 and 79 are rendered alternately positive as the current from the source 70 reverses in direction. Current impulses of the carrier frequency are transmitted alternately by the devices 78 and 79 as the polarity of the wave from source 70 reverses and for those instants when the grid $a'$ or $b'$ respectively is made sufficiently positive by the impressed wave potentials.

Figure 13:
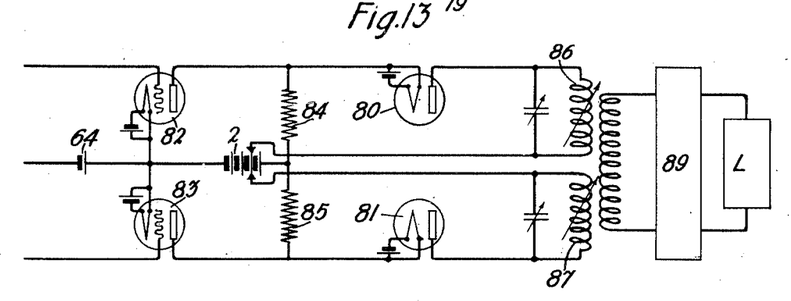

Fig. 13 illustrates a type of modulating circuit in which two-electrode devices 80 and 81 are used in conjunction with three-electrode devices 82 and 83 in a novel manner. With this arrangement the curvature of the space current characteristics of the devices 82 and 83 near zero space current values is avoided, whereby a substantially linear relation is obtained between grid voltage and the space current passing through output windings 86 and 87. The resistances 84 and 85 are included in the anode circuits of the devices 82 and 83 respectively. In shunt of the resistance 84 is the circuit comprising the discharge tube 80, the winding 86 and a portion of battery 2 depending upon the position of the tap connection. Similarly, in shunt of resistance 85 is the circuit including the discharge tube 81, primary winding 87 and a portion of battery 2. Such a potential is derived from battery 2 between the cathodes and anodes of the devices 80 and 81 as to render these tubes non-conducting to the carrier or modulating waves to be applied to the circuit except when both the carrier and the modulating waves are simultaneously applied, this potential from source 2 being applied as in the other figures in a direction to make the anodes of the devices 80 and 81 negative with respect to their cathodes. The source 64 in the common grid circuits of the discharge tubes 82 and 83 is for polarizing the grids of these tubes negatively. The outgoing circuit may comprise any suitable load circuit L and may, if desired, also include suitable amplifying or wave selecting and filtering circuits generally indicated at 89 for transmitting only one side band or any desired portion of the modulated wave. Any suitable type of input circuit for the devices 82 and 83 may be used and preferably the input circuit will be the same type as indicated in Fig. 12 for the uppermost pair of devices in that figure.

In the operation of the arrangement of Fig. 13, the resistances 84 and 85 and the sources 2 and 64 are so proportioned with respect to the other elements of the circuit that when either the signaling or the carrier wave alone is impressed on the circuit, no current flow results through the windings 86 and 87 but when positive potentials greater than the maximum voltage of the carrier wave are impressed, current is transmitted through the winding 86 or 87. For this purpose, the resistances 84 and 85 are preferably of greater value than the anode-cathode impedance of the respective tubes 82 and 83. The impedance of either circuit 80, 86 in parallel with resistance 84, or circuit 81, 87 in parallel with resistance 85 is approximately equal to that of the tubes 82 or 83 while space current is passing through windings 86, 87. The impedance of either device 80 or 81 is preferably much lower than the anode-cathode impedance of the three-electrode tubes. The condition of zero current in the output windings 86, 87 may result either from zero space current in the tubes 82, 83 or from the condition that the drop of potential through resistances 84 and 85 produced by current flow from source 2 through either tube 82 or 83 at the instant of maximum positive carrier wave potential, when no control wave is being impressed, is just neutralized by the negative polarizing potential derived from the source 2 and applied to the tubes 80 and 81. When both signaling and carrier waves are impressed, at the instants of maximum positive potential impressed alternately on the grids of tubes 82 and 83, current is transmitted through said tubes with a consequent greater than normal drop of potential across resistances 84 and 85. These potential drops more than overcome the polarizing potential derived from source 2 for the tubes 80 and 81 and the resulting impulses of current traverse the windings 86 and 87 and are impressed on the outgoing circuit.

While the source 64 might be given such a large negative potential as normally to block transmission through the tubes 82 and 83, it is preferable to have the grid potential of these tubes at such a negative value that at the instants of maximum positive potential of the carrier wave when the smallest amount of positive potential of the control wave is added thereto, the current transmitted through the tubes 82, 80 or 83, 81 has a value which is approximately at the lower end of that portion of the tube characteristic for which a substantially linear relation exists between grid voltage and space current. The values of resistances 84 and 85 being high, very small current is transmitted through the local circuits of the tubes 82 and 83 during the non-signaling periods and the losses during these times are small. When the impressed voltages are large enough to bring the tubes 80 and 81 into operation, the principal current flow takes place through, for example, tubes 82 and 80 in series, winding 86 and battery 2 or through the tubes 83 and 81, winding 87 and battery 2. The upper half of the grid voltage anode current characteristic of a three-electrode device normally has a curvature which is concave downwards, whereas the voltage current characteristic of a two-electrode device, such as 80 or 81, normally a has a curvature which is convex downward. In case the devices 82, 83 are to be worked at the upper end of their characteristics, the non-linear transmission characteristics of the two kinds of tubes may be made complementary, so that they neutralize each other to an extent and give a resultant characteristic of substantially linear form so that relatively large currents can be transmitted through the circuit with small distortion.

Figure 14:
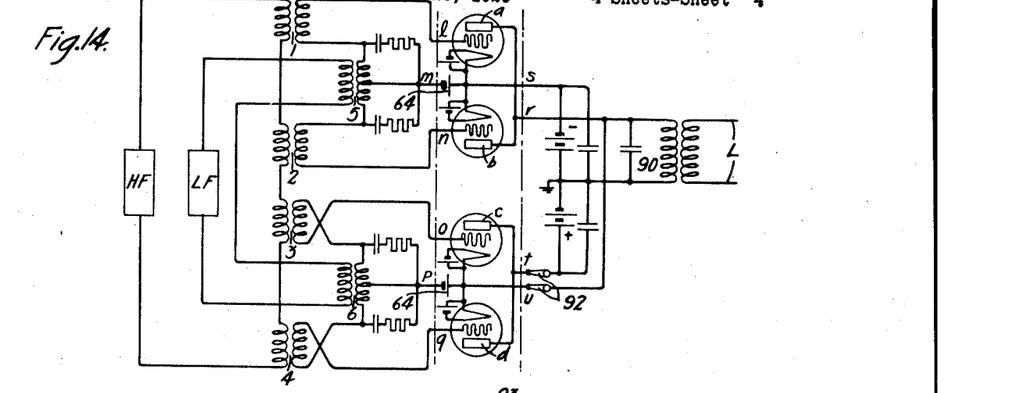

In each of the figures thus far described, in which a plurality of tubes are used, the impulses transmitted through the tubes are applied to different oscillation or impulsing circuits, from which in turn the waves are applied to a single outgoing or load circuit. It is not necessary to employ a plurality of resonant circuits to which to supply the wave impulses from the different tubes. Fig. 14, for example, shows a circuit capable of giving full wave modulation with all of the wave impulses impressed on a single outgoing circuit 90, preferably resonant at the frequency of the principal component transmitted. In the form of circuit shown in Fig. 14, four tubes, each with a third or control electrode, are employed, the third electrode of each tube being polarized so far negative by the source 64 as to block transmission except when both the carrier and modulating waves are impressed. In the drawing it is assumed that the high frequency or carrier is applied through transformers 1, 2, 3 and 4, which may have separate cores or may all have a common core; and the low frequency or modulating waves are applied through transformers 5 and 6, which likewise may be wound on one core.

If all four tubes are in circuit, as shown, it will be seen that the low frequency wave will tend to make the tubes with anodes $a$ and $c$, for example, simultaneously active for a number of periods of the high frequency wave, while the high frequency wave controls transmission through these two tubes alternately. As a result, circuit 90 is impulsed once each half period of the carrier frequency, and in alternate senses, the amplitude of the impulses being determined by the instantaneous amplitude of the low frequency modulating wave. A modulated wave containing side-band components but no component of the unmodulated carrier is thus transmitted to the load L. A phase shift of 180° occurs in the exciting impulses as the modulating wave reverses in sign. If the switch 92 is opened, the lowermost pair of tubes are thrown out of circuit, and the upper pair will serve to transmit an impulse once each period instead of once each half period, of the carrier frequency, but the general type of the wave produced is the same as when all four tubes are used, except for the effects of the less continuous impulsing.

Figures 14A, 15:
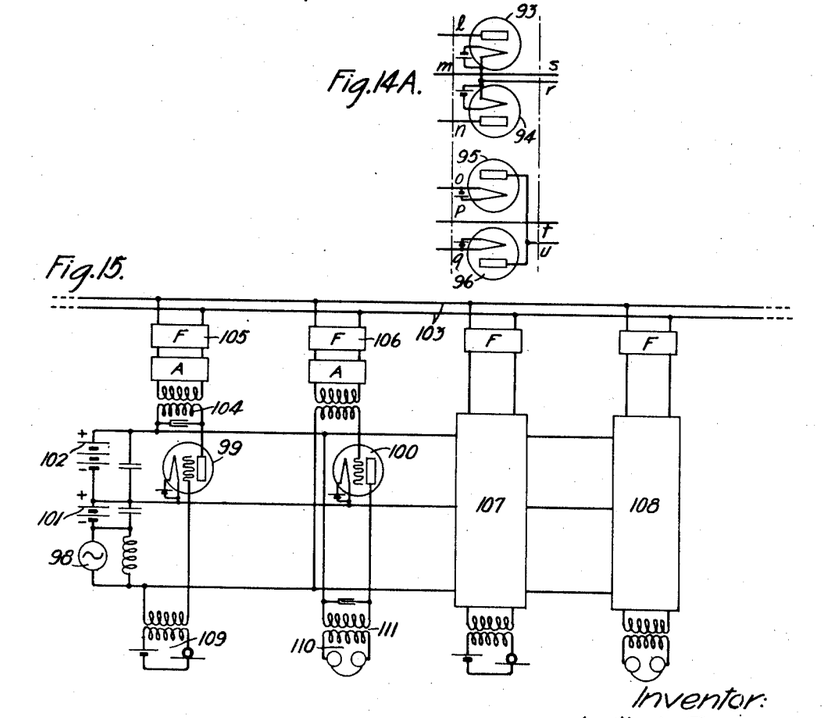

If it be desired to use two-electrode tubes in place of the three-electrode tubes shown in Fig. 14, the tubes 93, 94, 95 and 96 of Fig. 14$^A$, may be connected into the circuit of Fig. 14 between the vertical broken lines shown on the figure, and the three-electrode tubes removed. The six junction points $l$, $m$, $n$, $o$, $p$, $q$ on the left, and the four junction points $r$, $s$, $t$, $u$, on the right will make clear the exact manner of connection of the two-electrode tubes into the circuit.

With the two-electrode tubes connected in circuit in the manner above described, the modulating wave will tend to make the two tubes 93 and 96, for example, active simultaneously and for a number of periods of the carrier wave. The carrier wave will supplement this tendency in the two tubes alternately, with the result that circuit 90 will be impulsed alternately every half-period of the carrier wave. As before, also, the switch 92 may be opened to remove the lower pair of tubes from circuit.

The production of abrupt impulses through the discharge device as in any of the foregoing circuit arrangements, will result in the production not only of wave components of the fundamental impulsing frequency, but also components of harmonic frequencies. If the circuit which is impulsed is tuned to one of these harmonic frequencies, the production of such harmonic frequency wave will be favored, and by suitable tuning or filtering circuits, any desired harmonic or harmonics may be separated out for independent use.

Fig. 15 illustrates a carrier transmission system of simplified construction making use of this principle. A single source of carrier waves 98 of any desired type and any convenient frequency, for example, 5,000 cycles per second, supplies all of the modulating and detecting devices 99, 100, etc., of any desired number of transmitting and receiving sets. The tubes of these sets are also supplied from a common source 101 of negative polarizing potential, and a common source 102 of plate current. Each modulating device, such as 99, is connected to the line 103 through an impulse circuit 104, amplifier A, and filter 105, preferably of the type shown in the patent to G. A. Campbell No. 1,227,113, filed May 22, 1917. This filter is designed to pass the band of frequencies employed in the transmission of a particular message, but to suppress transmission of currents having frequencies outside this range. Each receiving device, as 100, is connected to the line 103 through an amplifier A and a filter 106 of the Campbell type referred to.

In operation, speech currents are developed in the circuit containing the microphone 109 and are impressed on the grid of the tube 99, tending to make this tube active to transmit carrier waves during the portions of the speech wave that make the grid less negative. The circuit 104 is preferably tuned to the frequency of the wave used as a carrier, which may in the case of one channel be the fundamental frequency of the source 98 (assumed to be 5,000) and in the case of other transmitting channels of the same station will be a harmonic frequency of the wave from source 98. If it be assumed that the second harmonic, or 10,000 cycles, is to be used as the carrier frequency for this channel, the circuit 104 is tuned to this frequency, and therefore it favors the production of side-band components based on a carrier frequency of 10,000 cycles per second, when speech is being directed against the microphone. The side-band components so produced together with other components that may be present, are amplified and passed through the filter 105 which limits the currents applied to the line to the frequencies employed on the 10,000 cycle channel. Another transmitting set, such as that diagrammatically indicated at 107, would have its impulsing circuit and channel filter designed to transmit the frequencies based on a different harmonic of the wave from source 98.

In receiving, the modulated waves of the frequency to pass filter 106 are selected from the line by that filter, are amplified, and are impressed on the grid of tube 100, so that during their wave portions which make the grid less negative, the device 100 tends to transmit current. When the carrier from source 98 also tends to make the grid less negative, impulses of current are transmitted through device 10, and these impulses represent components of the fundamental frequency and harmonics of the fundamental. Currents of the low frequency represented by the signals, such as speech, will result only from the interaction between the incoming modulated waves and those locally produced components which have the carrier wave frequency employed by this channel, and these speech components will be transmitted to the receiver 110 through the speech transformer 111, which preferably excludes higher frequencies.

In similar manner the incoming set indicated at 108 receives the speech transmitted on a carrier frequency of a different harmonic of the fundamental.

If desired a low-pass filter, which will pass speech but suppress higher frequencies, may be included between the tube 100 and the transformer 111, but this is not essential provided the transformer or the receiver, or both, possess the proper degree of frequency discrimination.

The invention has been described in connection with circuits employed as modulators, but it is to be understood that said circuits may be equally well employed as detectors of carrier waves. When the circuits disclosed are employed as detectors, the input source HF transmits waves of unmodulated carrier wave frequency to the tube. Modulated carrier waves for detection may be applied to the circuit at the point to which the modulating waves are applied when the circuit is used as a modulator, or, if desired, the modulated waves may be supplied over the same circuit HF as the unmodulated carrier waves, in which latter case the source LF together with any transformer coupling therefor may be omitted. The output transformer, which has been described in connection with modulation as being capable of transmitting modulated waves, should be capable for the purpose of detection of efficiently transmitting waves of detected frequency to the load or receiving circuit associated with said transformer. The capacity may be employed in shunt to the primary of the output transformer for the purpose of forming a low impedance path to the carrier wave frequency transmitted thereto, while offering a relatively high impedance path to the desired detected waves. In case the modulated carrier waves to be detected are supplied to the tube circuit by way of the imput circuit LF, the circuit LF should in this case have a low impedance to the modulated carrier waves so that they may be efficiently transmitted to the tube circuit.

In order to provide a sensitive detecting action, it is preferable to adjust the polarizing source 2 or 64 to a value permitting the transmission through the tube of impulses of unmodulated carrier wave frequency when the modulated wave is not present. For this purpose, the voltage of source 2 or 64 may be reduced below the value at which it neutralizes the unmodulated carrier wave in the absence of the modulated wave, or the source 2 or 64 may be omitted. If desired, the source 2 or 64 may be similarly reduced in voltage or omitted when the circuits are employed as modulators. It is to be noted that in the circuits of the present invention, the unmodulated carrier wave may be of higher or lower frequency than the wave which modulates or controls the carrier wave.

In the present invention, each modulating and detecting space current device functions as a switch or commutating device to open and close the circuit under the joint control of the carrier wave and a control wave which may be either a modulating wave or a modulated wave, according to whether the space current device is a modulator or detector, respectively. This switching takes place at substantially the carrier wave frequency, and is substantially synchronized with the carrier wave, the synchronism being maintained by the carrier wave. Inasmuch as the space current devices are free from inertia effects, the switching is not affected by such effects as occur in mechanical switching.

While a number of forms of embodiment of the invention have been illustrated and described for the purpose of illustrating the general nature and theory of operation of the invention, not all of the modes of operation or application of each of the arrangements illustrated have been pointed out, but the particular arrangements that have been indicated will serve to show that the invention is capable of being realized in a variety of forms. The invention should not be construed as limited to those forms which have been chosen for illustration but should rather be determined only from the scope of the claims.

What is claimed is:

1. The method of producing a wave of varying amplitude comprising producing a wave of constant amplitude, rectifying the successive halves of said wave respectively in parallel paths to suppress transmission in each path of half waves of one sign, normally opposing to the half waves not so suppressed in each path a voltage substantially equal to the maximum voltage of the half waves, varying alternately the effective value of the opposing voltage to produce resultant rectified waves of varying amplitude, and applying the waves in the said parallel paths to a load circuit in respectively opposite sense.

2. In electric signaling the method comprising rectifying the successive halves of an alternating current wave in a plurality of parallel paths to suppress transmission in each path of half waves of one sign, normally opposing a voltage to the half waves not so suppressed in each path to prevent transmission of said waves, varying the opposing action of said voltage in the respective paths alternately by a signal wave, and applying the waves from all of said paths to a signal transmitting medium.

3. In electric signaling, the method comprising producing an alternating current wave of constant amplitude, rectifying the successive halves of said wave in a plurality of parallel paths to suppress transmission in each path of half waves of one sign, opposing a voltage to the half waves not so suppressed in each path, varying the opposing voltage successively in certain of said paths, and supplying the resulting waves from said paths to a signal transmitting medium.

4. In carrier wave signaling, the method comprising rectifying the successive halves of a carrier wave in a plurality of parallel paths to suppress transmission in each path of half waves of one sign, opposing a varying voltage to the transmission of the half waves not so suppressed in each path, and combining the resulting waves in said paths to produce a signal modulated wave having substantially no component of the carrier frequency.

5. In a wave controlling circuit, means to provide a plurality of discharge spaces, a source of high frequency potential waves applied to said discharge spaces in a manner to produce current flow through them, an opposing voltage applied to said discharge spaces for substantially preventing the flow of any current through them under control of said wave source, and a source of low frequency waves applied to said discharge spaces in a manner to aid said high frequency voltage wave to produce resultant current flow through one of said devices during one portion of the low frequency wave while further opposing current flow through the other discharge space and to aid said high frequency wave to produce resultant current flow through said other discharge space during another portion of the low frequency wave.

6. In combination, a pair of electric discharge devices each having an anode and a cathode, a source of carrier waves, a source of signaling waves, a source of polarizing potential applied to both devices of such direction and magnitude as to prevent transmission of current through either device in response to an applied voltage equal to that of either of said waves alone, both of said devices being oppositely related to each of said wave sources.

7. In a modulating arrangement, a pair of electric discharge devices each having a cathode and an anode, a source of signaling waves, a source of carrier waves, a source of polarizing potential of such magnitude and direction as to prevent the transmission of current through said devices in response to an applied voltage equal to that of either of said waves alone, said source of carrier waves and said source of signal waves being each oppositely related to said devices.

8. In combination, a plurality of electric discharge devices, a source of carrier waves continuously applied to said devices, a source of signaling waves variably acting on said devices, means for normally preventing discharge current through any one of said devices in response to the applied carrier wave, and for causing said devices to transmit current successively in response to said carrier wave under control of a signal wave simultaneously applied.

9. In a modulating system, means to provide two pairs of discharge spaces, cathode and anode means therefor, a source of carrier waves applied to both pairs of discharge spaces, said source being applied to the individual spaces of each pair in respectively opposite sense, a source of signaling waves applied to each pair of discharge spaces, said last source being similarly applied to the individual discharge spaces of each pair, means for blocking transmission of current from either source through said discharge spaces when either source is applied without the other, and, when both sources are applied together, for permitting said pairs of discharge spaces to transmit current from said carrier wave source alternately under control of said signaling wave, and the individual discharge spaces of a pair to transmit carrier current alternately, and a transmission circuit associated with all of said discharge spaces for conveying the current transmitted by them.

10. In combination, a plurality of electric discharge devices, a source of carrier waves continuously applied to said devices, a source of control waves variably acting on said devices, energy receiving means having a pair of terminals conductively connected to each of said discharge devices to receive energy therefrom, means for normally opposing the discharge of current through said devices in response to the applied carrier wave, and for causing said devices to transmit current to said energy receiving means successively in response to said carrier wave under the control of said control wave.

11. In combination, a plurality of discharge devices, a common plurality of wave sources applied to each of said devices, control means for said devices to permit of current flow through said devices only in response to two of said waves being impressed on a device simultaneously, and to cause abrupt impulses of current to flow through said devices under control of a plurality of waves simultaneously applied, and a single oscillation circuit for receiving the impulses of current from said plurality of devices and for converting the energy of said impulses into oscillatory current energy.

In witness whereof, I hereunto subscribe my name this 27th day of February A. D., 1923.

JUSTIN L. FEARING